July 7, 1942.  E. M. CHANCE ET AL  2,289,242

CONTROL SYSTEM

Filed Dec. 9, 1939

Inventors:-
Edwin M. Chance
Britton Chance
by their Attorneys
Howson & Howson

Patented July 7, 1942

2,289,242

UNITED STATES PATENT OFFICE 2,289,242

CONTROL SYSTEM

Edwin M. Chance and Britton Chance, Mantoloking, N. J.; said Edwin M. Chance assignor to said Britton Chance Application December 9, 1939, Serial No. 308,468

14 Claims. (Cl. 172—282)

This invention relates to a novel motor control system which is capable of general use in any system wherein it is desired to control some condition. The system is particularly adapted, however, for use in automatic steering systems for dirigible craft, such as ships, to maintain the craft on its course. More particularly, the invention relates to control systems of the type employing light-sensitive devices for controlling the operation of a motor; for example, in the case of an automatic steering system, such devices control actuation of the steering element, such as a ship's rudder, in response to deviation of the craft from its course.

The invention has for its principal object the provision of an improved motor control system embodying the features set forth hereinafter.

A more specific object of the invention is to provide a novel system which is rendered extremely sensitive to light beam by a novel utilization of electron discharge devices.

In certain prior motor control systems adapted particularly for use in the automatic steering of dirigible crafts, such as ships, there have been employed at least three light-sensitive devices, two of which are adapted to control the operation of a reversible motor in response to deviations of the craft from its course in either direction, while the third or center light-sensitive device is adapted to interrupt the operation of the motor when the light beam is caused to impinge on such device through the action of the follow-up mechanism. Heretofore it has been necessary to provide some additional means for maintaining the motor energized when the beam passes beyond the outer cells. Moreover, in certain circumstances, such systems have exhibited certain objectionable characteristics, for example, in the case of an automatically steered ship which is caused to yaw violently in a heavy sea, the impingement of the light beam upon the center light cell during the follow-up action may be substantially instantaneous or of such short duration that the apparatus may fail to respond to the activation of the center cell. This has been due to the fact that the response of such systems has been dependent on insensitive devices, such as mechanical relays. As a result, the steering motor is not deenergized and the craft may continue to turn in the same direction or some other undesirable condition may result.

By the present invention there is provided an improved system of this general character which is extremely sensitive to activation of the center cell and which eliminates the above-mentioned defects. This is accomplished by a novel arrangement of trigger-type, grid-controlled electron discharge devices, as described hereinafter. The system also provides a simple means for maintaining the motor energized, even though the light beam passes beyond the outer cells, until the center cell is activated.

The system provided by the invention also enables accurate "weather control," which term refers to the control which prevents the system from functioning in response to transient yaws or deviations of the craft as distinguished from yaws of the craft at its natural period.

The invention may be clearly understood by reference to the accompanying drawing, wherein Figure 1 is a diagrammatic illustration of a simple steering system in which the present invention may be employed;

Since the invention is particularly adapted for use in an automatic steering system, it will be described in its application to such a system, although it is to be understood that the invention is not thus limited.

Figure 1:
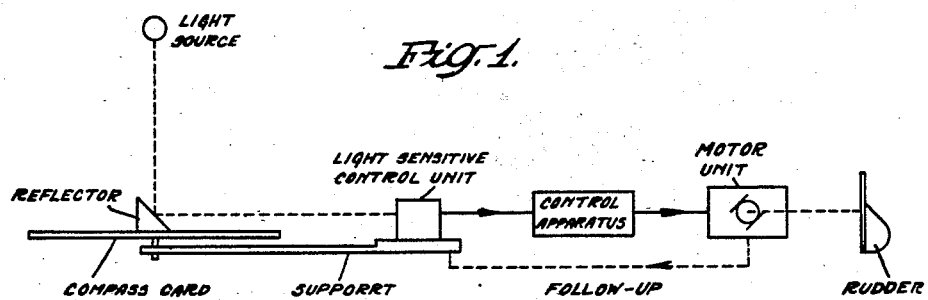
Figure 2:
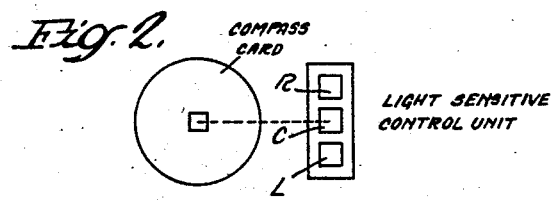
Fig. 2 is a plan view of the optical portion of the system of Fig. 1.

For the purpose of the present description, the diagram of Fig. 1 will suffice to illustrate the general arrangement of a light-controlled steering system in which the present invention may be employed. As shown in Fig. 1, a reflector is mounted at the axis of a compass card and receives light from a light source above the compass card and axially aligned therewith. The reflector projects a stationary beam of light onto a light-sensitive control unit carried by a support which pivots about the axis of the compass card, and is mounted on the craft so as to be movable relative to the stationary light beam in accordance with deviations of the craft from its course in one direction or the other. The light-sensitive control unit functions to control the apparatus described hereinafter, which apparatus in turn controls the motor unit that drives the rudder. In this manner the rudder is thrown in a direction to bring the craft back on its course whenever the craft yaws or deviates from its course and causes the light beam to traverse the light-sensitive cells. The motor unit operates a follow-up mechanism to return the light-sensitive unit to normal position relative to the light beam, thus interrupting the energization of the motor and the throw of the rudder. As shown in Fig. 2, the system comprises at least three light-sensitive cells. The two outer cells L and R control the operation of the steering motor, while the center cell C functions to interrupt the operation of the motor in the manner described hereinafter.

This invention is concerned only with the control apparatus which operates the motor in response to relative movement between the light beam and the light-sensitive cells. The remainder of the apparatus may take any of the various forms known in the art.

Figure 3:
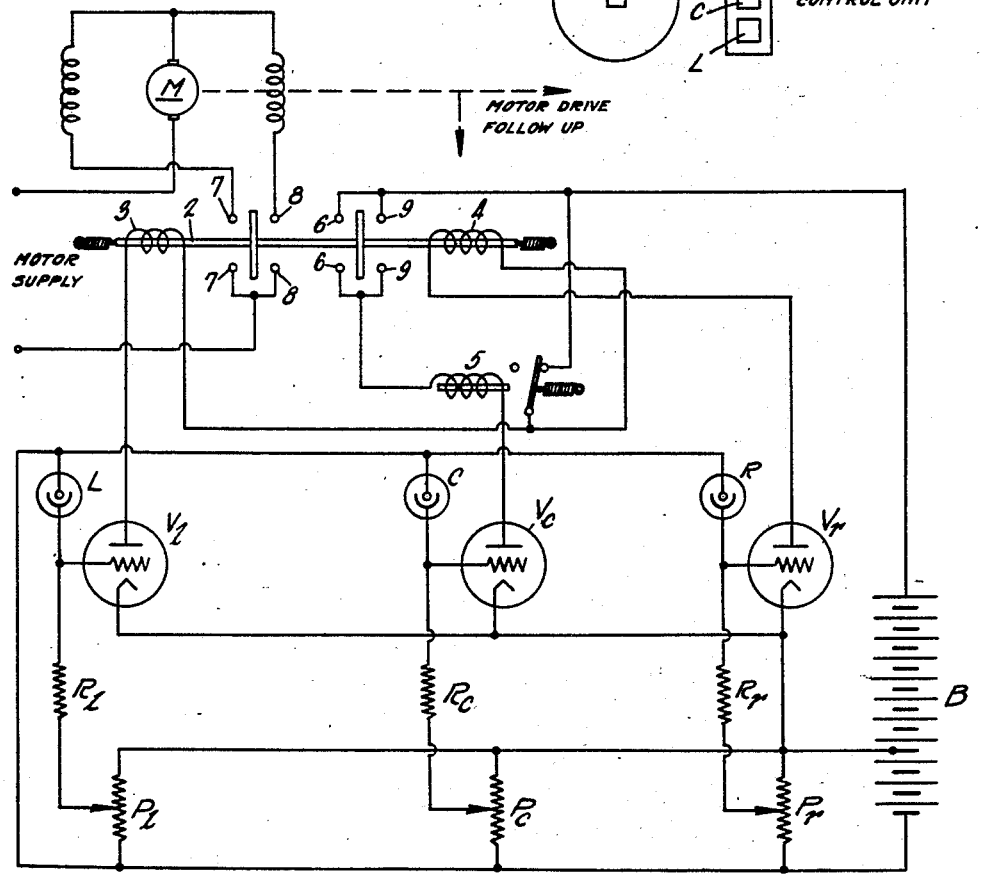
Fig. 3 is a diagrammatic illustration of the electrical circuits of the system.

Referring now to Fig. 3, the reversible motor is shown at M, the motor drive and the follow-up drive being indicated by broken line representations. It will be understood that the follow-up drive may take any suitable form and may be adapted to move the light cell assembly relative to the light beam, as indicated in Fig. 1. The motor M is controlled by a double-acting relay or contactor 1 which controls the connections of the motor so as to operate the same in either direction, as will be more clearly understood later. The relay 1 comprises a movable armature 2 which is normally disposed in a neutral or normal position, as shown, and which is adapted to be actuated in one direction or the other by the relay coils 3 and 4. The armature may be maintained in a balanced or neutral position by means of springs, as illustrated, or in any other suitable manner. The coils 3 and 4 are connected respectively in the space current circuits of trigger-type, grid-controlled electron tubes $V_l$ and $V_r$. By a trigger-type tube is meant one which is characterized by its being operative only in response to a sufficient triggering or firing potential applied to its grid, after which the grid loses control of the space current flow which must be interrupted by some external means. Preferably, the tubes $V_c$ and $V_r$ are Thyratrons, although any other suitable tube of this general type may be employed. As is well known, the conductivity of these tubes is maintained by virtue of their gas content and, when once initiated, may be interrupted only some suitable external means.

A normally closed relay 5, which may be spring biased to its closed condition, has its contacts connected in the space current circuits of both of the tubes $V_l$ and $V_r$ for the purpose of stopping these tubes, as will be described later. The coil or winding of relay 5 is connected in the space current circuit of an electron tube $V_c$ and the space current circuit of this tube also includes certain of the contact of the reversing relay 1. Tube $V_c$ is preferably a trigger-type tube, such as a Thyratron, but if the relay 5 is sufficiently sensitive, any suitable grid-controlled tube may be employed, as described hereinafter.

The three tubes $V_l$, $V_c$ and $V_r$ are operatively associated respectively with the three light-sensitive cells L, C and R. It will be noted that the three cells are connected in parallel in an energizing circuit and each has an associated potentiometer for controlling its current, the three potentiometers $P_l$, $P_c$ and $P_r$ being connected across a portion of the battery or supply source B. It will be noted also that the cathodes of the three tubes are connected in parallel relation and are connected to the potentiometer circuit, as are also the grids of the tubes. The arrangement is such that the potentiometers also control the normal bias applied to the respective tubes. Since there is a voltage drop across each potentiometer a variable bias is applied between the grid and cathode of each tube, such bias being dependent on the potentiometer setting. It will be noted that each potentiometer controls differentially the voltage applied to its associated light cell and the bias voltage applied to the associated tube. Thus, as the movable contact of a potentiometer is moved in a direction to decrease the voltage applied to its associated light cell, the bias voltage applied to the associated tube increases, and vice versa. Each tube also has an associated grid resistor, these resistors being designated respectively $R_l$, $R_c$ and $R_r$. When current flows in any one of the light-sensitive cell circuits, the voltage developed across the associated resistor is applied between the grid and cathode of the associated tube in opposition to the bias voltage.

Considering now the operation of the system, in the normal condition, that is, with the light beam impinging on the center cell C, the elements will be in the condition shown in Fig. 3. It will be noted that the plate circuit of the tube $V_c$ is open. While the plate circuits of the tubes $V_l$ and $V_r$ are closed through the normally closed contacts of relay 5, these tubes are inoperative by virtue of the normal bias applied to them, that is to say, the bias voltages derived from the potentiometers associated with these tubes maintain them inoperative.

Assume now that the craft deviates from its course in such direction as to cause the light beam to leave the center cell C and impinge upon the left-hand cell L. As a result the cell L will be activated, causing current to flow in its circuit through the grid resistor $R_l$. The voltage thus established across this resistor is in opposition to the bias voltage and is sufficient to trigger or fire the tube $V_l$. Due to the character of the tube, it is very sensitive and will be operated even by instantaneous impingement of the light beam on cell L. Moreover, the operation of the tube will be maintained even though the beam may pass beyond the cell. Consequently, space current flows in this tube and through the space current circuit thereof comprising the relay winding 3, the closed contacts of relay 5, and a portion of the battery B. The energization of the winding 3 effects operation of the relay armature 2 toward the left, thus closing contacts 6 and 7. The closure of contacts 7 completes an energizing circuit for the motor M through one of its associated field windings, thus operating the motor in a direction to bring the craft back toward its course. The closure of contacts 6 completes the space current circuit of tube $V_c$, but this tube is inoperative by virtue of its bias and the fact that the light beam has left the center cell.

The follow-up action brings the light beam back onto the center cell, and the activation of this cell causes current to flow through resistor $R_c$ which applies an operating potential to the grid of the tube $V_c$. Consequently, space current flows in this tube through the winding of relay 5, thus opening the contacts of this relay which opens the space current circuit of tube $V_l$. Even though the light beam might traverse the cell C very rapidly and pass beyond it, the momentary activation of this cell is sufficient to trigger the tube $V_c$ and open the plate circuit of tube $V_l$. The consequent deenergization of relay winding 3 causes armature 2 to return to its normal position which deenergizes the motor M and opens the plate circuit of tube $V_c$.

If the tube $V_c$ is a trigger-type tube, such as a Thyratron, the tube itself provides the required sensitivity for the above-described action. However, if the relay 5 is sufficiently sensitive, the tube Vc may be an ordinary triode biased to cut-off and adapted to supply a sufficiently strong impulse to operate the relay when the tube is activated.

When the craft deviates from its course in the opposite direction, thus activating the right-hand cell R, the operation is the same as above described except in this instance the relay winding 4 is energized by the firing of tube Vr, thus closing contacts 8 to operate motor M in the other direction and also closing contacts 9 to complete the plate circuit of the tube Vc.

It will be seen that the system is extremely simple and yet it is very sensitive to the light beam. The employment of trigger-type tubes, such as Thyratrons, as the tubes Vl and Vr renders the system highly sensitive to deviations in either direction, eliminating the insensitivity of prior systems in which the response of the system has been dependent on response of mechanical devices such as relays. In the present system, tubes Vl and Vr determine the response of the system and insure positive operation of the relay 1. Moreover, these tubes maintain operation of the motor until the beam again impinges on cell C. Further, the tube Vc is highly sensitive and insures deenergization of the motor when the beam returns to the center cell.

By varying the setting of the potentiometers, the sensitivity of each cell and associated tube may be varied, and due to the differential control above-mentioned, a substantial variation in sensitivity is obtained by small adjustment. It will be apparent that adjustment of Pl or Pr to decrease the sensitivity will require greater deviation of the light beam to activate the light cell, that is to say, more of the beam must fall on the cell to activate it, and the greater bias on the associated tube will require a larger potential to fire or trigger the tube. Conversely, when the potentiometer adjustment is such as to increase the sensitivity, the increased operating potential applied to the light cell and the decreased tube bias render the system responsive to smaller deviations. Thus, there is provided a sensitive weather control adjustment by which the sensitivity of either outer cell and its associated tube may be varied independently, and the sensitivity of the center cell may also be varied.

Although the invention has been described with reference to a specific embodiment, it will be understood that it is capable of various modifications, such as fall within the scope of the appended claims.

We claim:

1. In a control system, a circuit to be controlled, means for energizing said circuit, a grid-controlled electron tube characterized by self-maintenance of its conductivity in response to a starting potential applied to its grid, a space current circuit for said tube, means controlled by the space current of said tube for actuating said circuit-energizing means, means for applying a starting potential to the grid of said tube, another electron tube having a space current circuit, means for controlling said other tube, and means controlled entirely by the space current of said other tube for interrupting the space current circuit of said first tube, thereby to effect deenergization of said controlled circuit.

2. In a control system, a circuit to be controlled, means for energizing said circuit, a grid-controlled electron tube characterized by self-maintenance of its conductivity in response to a starting potential applied to its grid, a space current circuit for said tube, means controlled by the space current of said tube for actuating said circuit-energizing means, means for applying a starting potential to the grid of said tube, another electron tube similar in character to said first tube and having a space current circuit, means for applying a starting potential to the grid of said other tube to initiate operation of the same, and switching means controlled by the space current of said other tube for opening the space current circuit of said first tube, thereby to effect deenergization of said controlled circuit.

3. In a control system, a circuit to be controlled, means including a relay for energizing said circuit, a grid-controlled electron tube characterized by self-maintenance of its conductivity in response to a starting potential applied to its grid, a space current circuit for said tube, means controlled by the space current of said tube for energizing said relay, means for applying a starting potential to the grid of said tube, another electron tube having a space current circuit, means for controlling said other tube, a relay controlled by the space current of said other tube for interrupting the space current circuit of said first tube, thereby to effect deenergization of said controlled circuit, and contacts on said first relay for interrupting the space current circuit of said other tube.

4. In a system for controlling a circuit in response to a light beam, means for energizing said circuit, a grid-controlled electron tube characterized by self-maintenance of its conductivity in response to a starting potential applied to its grid, a space current circuit for said tube, means controlled by the space current of said tube for actuating said circuit-energizing means, a light-sensitive device associated with said tube, means responsive to said device for applying a starting potential to the grid of said tube, another electron tube having a space current circuit, another light-sensitive device associated with said other tube, means responsive to said other light-sensitive device for controlling said other tube, and means controlled by the space current of said other tube for interrupting the space current circuit of said first tube, thereby to effect deenergization of said controlled circuit.

5. In a control system for effecting control action in opposite directions, a pair of grid-controlled electron tubes each characterized by self-maintenance of its conductivity in response to a starting potential applied to its grid, each of said tubes having a space current circuit, means controlled by the space current of one of said tubes for initiating control action in one direction, means controlled by the space current of the other tube for initiating control action in the opposite direction, means for applying a starting potential to the grid of either tube to initiate operation thereof, another electron tube having a space current circuit, means for controlling said last-mentioned tube, and switching means controlled by the space current of said last-mentioned tube for opening the space current circuits of said first-mentioned tubes.

6. In a control system for effecting control action in opposite directions, a pair of grid-controlled electron tubes each characterized by self-maintenance of its conductivity in response to a starting potential applied to its grid, each of said tubes having a space current circuit, means controlled by the space current of one of said tubes for initiating control action in one direction, means controlled by the space current of the other tube for initiating control action in the opposite direction, a pair of spaced light-sensitive devices associated respectively with said tubes, means responsive to each of said devices for applying a starting potential to the grid of the associated tube, another electron tube having a space current circuit, means controlled by the space current circuit of said last-mentioned tube for interrupting the space current circuits of said first-mentioned tubes, another light-sensitive device interposed between said first devices, and means responsive to said other light-sensitive device for actuating said last-mentioned tube.

7. In a control system for effecting control action in opposite directions, a pair of grid-controlled electron tubes each characterized by self-maintenance of its conductivity in response to a starting potential applied to its grid, each of said tubes having a space current circuit, means controlled by the space current of one of said tubes for initiating control action in one direction, means controlled by the space current of the other tube for initiating control action in the opposite direction, a pair of spaced light-sensitive devices associated respectively with said tubes, means responsive to each of said devices for applying a starting potential to the grid of the associated tube, another electron tube similar in character to said first-mentioned tubes and having a space current circuit, means controlled by the space current cicuit of said last-mentioned tube for interrupting the space current circuits of said first-mentioned tubes, another light-sensitive device interposed between said first devices, and means responsive to said other light-sensitive device for applying a starting potential to the grid of said last-mentioned tube to actuate the same.

8. In a control system for effecting control action in opposite directions, a double-acting control relay, a pair of grid-controlled electron tubes each characterized by self-maintenance of its conductivity in response to a starting potential applied to its grid, each of said tubes having a space current circuit, means controlled by the space current of one of said tubes for actuating said relay in one direction, means controlled by the space current of the other tube for actuating said relay in the opposite direction, a pair of spaced light-sensitive devices associated respectively with said tubes, means responsive to each of said devices for applying a starting potential to the grid of the associated tube, another electron tube having a space current circuit, a relay controlled by the space current circuit of said last-mentioned tube for interrupting the space current circuits of said first-mentioned tubes, another light-sensitive device interposed between said first devices, means responsive to said other light-sensitive device for actuating said last-mentioned tube, and contacts on said first relay for interrupting the space current circuit of said last-mentioned tube.

9. In a system for controlling a circuit in response to a light beam, a plurality of grid-controlled electron tubes each having a space current circuit, each of said tubes being characterized by self-maintenance of its conductivity in response to a starting potential applied to its grid, a plurality of light-sensitive devices associated respectively with said tubes for actuating the same, a plurality of manually-adjustable potentiometers each associated with one of said tubes and its light-sensitive device for supplying a bias potential to the tube and an operating potential to the light-sensitive device, each potentiometer being connected to its associated light-sensitive device and tube and arranged to vary differentially the potential applied to said device and the bias potential applied to said tube, to thereby vary the sensitivity of each light-sensitive device and its associated tube, means responsive to the space current of certain of said tubes for energizing the controlled circuit, and means controlled by the space current of another of said tubes for interrupting the space current of said certain tubes, thereby to deenergize said controlled circuit.

10. In an automatic steering system for dirigible craft, electro-optical means constructed and arranged so as to be responsive to deviations of the craft from a predetermined course, a pair of grid-controlled electron tubes, each characterized by self-maintenance of its conductivity in response to a starting potential applied to its grid, a space current circuit for each of said tubes, means controlled by the space current of said tubes for effecting steering action in different directions, means controlled by said electro-optical means for applying a starting potential to the grid of either of said tubes in response to deviation of the craft in either direction, follow-up means for restoring the normal condition of said electro-optical means, another grid-controlled electron tube having a space current circuit, means controlled by the space current of said other tube for interrupting the space current circuits of said first tubes, and means controlled by said electro-optical means for actuating said other tube when the normal condition of the electro-optical means is restored.

11. In an automatic steering system for dirigible craft, electro-optical means constructed and arranged so as to be responsive to deviations of the craft from a predetermined course, a pair of grid-controlled electron tubes, each characterized by self-maintenance of its conductivity in response to a starting potential applied to its grid, a space current circuit for each of said tubes, means including a double-acting relay controlled by the space current of said tubes for effecting steering action in different directions, means controlled by said electro-optical means for applying a starting potential to the grid of either of said tubes in response to deviation of the craft in either direction, follow-up means for restoring the normal condition of said electro-optical means, another grid-controlled electron tube similar in character to said first tubes and having a space current circuit, a relay controlled by the space current of said other tube for interrupting the space current circuits of said first tubes, means controlled by said electro-optical means for actuating said other tube when the normal condition of the electro-optical means is restored, and contacts on said first relay for interrupting the space current circuit of said other tube.

12. In a motor control system, control means having a normal condition and operable therefrom by a variable influence, a pair of grid-controlled electron tubes, each characterized by self-maintenance of its conductivity in response to a starting potential applied to its grid, means controlled by said tubes for effecting motor operation in different directions, means responsive to operation of said control means from said normal condition for applying a starting potential to the grid of either of said tubes, follow-up means for restoring the normal condition of said control means, and means responsive to the restoration of said condition for interrupting the conductivity of the operative tube.

13. In a motor control system, electro-optical control means having a normal condition and operable therefrom by a variable influence, a pair of grid-controlled electron tubes, each characterized by self-maintenance of its conductivity in response to a starting potential applied to its grid, means controlled by said tubes for effecting motor operation in different directions, means responsive to operation of said control means from said normal condition for applying a starting potential to the grid of either of said tubes, follow-up means for restoring the normal condition of said control means, another grid-controlled electron tube, means controlled by said other tube for interrupting the conductivity of said first tubes, and means responsive to the restoration of said condition for actuating said other tube.

14. In a motor control system, control means having a normal condition and operable therefrom by a variable influence, said control means including light-sensitive means arranged for activation upon operation of the control means from said normal condition and other light-sensitive means arranged for activation upon restoration of said condition, a pair of grid-controlled electron tubes, each characterized by self-maintenance of its conductivity in response to a starting potential applied to its grid, means controlled by said tubes for effecting motor operation in different directions, means operable by said first-named light-sensitive means for applying a starting potential to the grid of either of said tubes, follow-up means for restoring the normal condition of said control means, and means operable by said other light-sensitive means for interrupting the conductivity of the operative tube.

EDWIN M. CHANCE.
BRITTON CHANCE.